(12) United States Patent
Pankajakshan et al.

(10) Patent No.: US 9,107,196 B2
(45) Date of Patent: *Aug. 11, 2015

(54) RECONNECTING DROPPED CALLS USING AN INTERNET PROTOCOL MULTIMEDIA SUBSYSTEM

(71) Applicant: Sprint Communications Company L.P., Overland Park, KS (US)

(72) Inventors: Bejoy Pankajakshan, Olathe, KS (US); Warren B. Cope, Olathe, KS (US); Pallavur Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,659

(22) Filed: Dec. 4, 2013

(65) Prior Publication Data

US 2014/0092721 A1    Apr. 3, 2014

Related U.S. Application Data

(63) Continuation of application No. 13/070,796, filed on Mar. 24, 2011, now Pat. No. 8,644,218.

(51) Int. Cl.
*H04L 29/06*     (2006.01)
*H04W 76/02*    (2009.01)

(52) U.S. Cl.
CPC ......... *H04W 76/028* (2013.01); *H04L 65/1006* (2013.01); *H04L 65/1016* (2013.01); *H04L 65/1073* (2013.01)

(58) Field of Classification Search
None
See application file for complete search history.

(56) References Cited

U.S. PATENT DOCUMENTS

| | | | |
|---|---|---|---|
| 8,442,517 B2 | 5/2013 | Walker et al. | |
| 8,644,218 B1 * | 2/2014 | Pankajakshan et al. | 370/328 |
| 2005/0117591 A1 | 6/2005 | Hurtta et al. | |
| 2008/0020776 A1 | 1/2008 | Deshpande et al. | |
| 2008/0037746 A1 | 2/2008 | Dufrene et al. | |
| 2008/0118047 A1 * | 5/2008 | Nachum | 379/210.01 |
| 2008/0248763 A1 | 10/2008 | Park et al. | |
| 2011/0182235 A1 | 7/2011 | Shaheen et al. | |
| 2012/0155445 A1 * | 6/2012 | Javaregowda et al. | 370/338 |
| 2012/0236709 A1 | 9/2012 | Ramachandran et al. | |

* cited by examiner

*Primary Examiner* — Marcus R Smith

(57) ABSTRACT

A Session Initiation Protocol (SIP) system controls an Internet Protocol (IP) communication session between a first communication device and a second communication device. A SIP control server receives a SIP bye message from the first communication device indicating a loss of the IP communication session, and in response, transfers a notification request for the second communication device to a SIP registration server. The SIP registration server processes a SIP registration message from the second communication device, and in response to the notification request and the SIP registration message, transfers a registration notification for the second communication device to the SIP control server. The SIP control server receives the registration notification for the second communication device, and in response, transfers a SIP invite message to re-establish the IP communication session to the first communication device.

20 Claims, 8 Drawing Sheets

RECONNECTING DROPPED CALLS USING AN INTERNET PROTOCOL MULTIMEDIA SUBSYSTEM

RELATED CASES

This patent application is a continuation of U.S. patent application Ser. No. 13/070,796 that was filed on Mar. 24, 2011 and is entitled "RECONNECTING DROPPED CALLS USING AN INTERNET PROTOCOL MULTIMEDIA SUBSYSTEM." U.S. patent application Ser. No. 13/070,796 is hereby incorporated by reference into this patent application.

TECHNICAL BACKGROUND

One of the most common customer complaints received by wireless service providers is dropped calls. Accordingly, wireless service provides have attempted to address these issues by developing systems and architectures that correlate and reconnect dropped calls. However, these reconnection schemes have resulted in negative repercussions for the network and the user. For example, invasive hardware monitoring costs and wasted resources such as additional circuits being held open are a common problem for wireless communication providers. Moreover, in some cases the reconnection schemes may also result in unpleasant user experiences such as message pop-ups, race conditions when re-dialing, and even subsequent dropped calls.

The IP Multimedia Subsystem (IMS) is an architectural framework for delivering Internet Protocol (IP) multimedia services. The IMS aids in access of multimedia and voice applications from wireless and wireline terminals by using a horizontal control layer that isolates the access network from the service layer.

OVERVIEW

A Session Initiation Protocol (SIP) system controls an Internet Protocol (IP) communication session between a first communication device and a second communication device. A SIP control server receives a SIP bye message from the first communication device indicating a loss of the IP communication session, and in response, transfers a notification request for the second communication device to a SIP registration server. The SIP registration server processes a SIP registration message from the second communication device, and in response to the notification request and the SIP registration message, transfers a registration notification for the second communication device to the SIP control server. The SIP control server receives the registration notification for the second communication device, and in response, transfers a SIP invite message to re-establish the IP communication session to the first communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
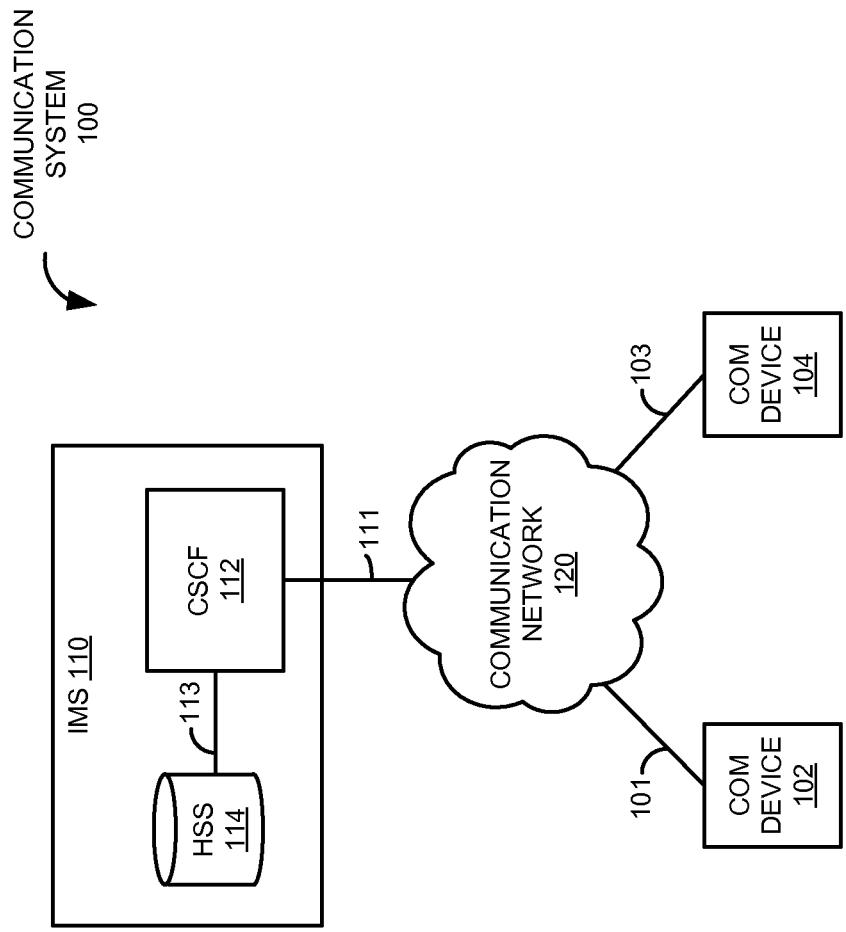
FIG. 1 illustrates operation of a communication system to subscribe for a service to control a communication session between a first communication device and a second communication device.

FIG. 1 illustrates communication system 100 to subscribe for a service to control a communication session between a first communication device and a second communication device. Communication system 100 comprises communication devices 102 and 104, internet protocol multimedia subsystem (IMS) 110, and communication network 120. IMS 110 includes call session control function (CSCF) 112 and home subscriber server (HSS) 114. Communication devices 102 and 104 are in communication with communication network 120 over links 101 and 103, respectively. IMS 110 is in communication with communication network 120 over link 111. IMS 110 is in communication with HSS 114 over link 113. In this example, two communication devices are shown for simplicity. More or fewer wireless communication devices may be included in communication system 100.

IMS 110 supports delivering IP multimedia services to communication devices 102 and 104 and aids in establishing communication sessions by providing authorization, authentication, and accounting and providing a network address for communication devices attempting to register with IMS 110. As discussed, IMS 110 includes CSCF 112 and HSS 114. CSCF 112 may comprise a SIP server that also performs session control. HSS 114 may include subscription related information such as subscriber profiles and typically performs the authentication, authorization, and accounting.

In operation, communication devices 102 and 104 establish a communication session with one another over communication network 120. CSCF 112 subsequently subscribes with HSS 114 to control the communication session without the use of application servers. For example, if communication device 102 detects a loss of signal (e.g., a dropped call), then communication device 102 transmits a modified SIP bye message which includes a code. Communication network 120 forwards the modified SIP bye message to CSCF 112. In response to the code, CSCF 112 subscribes to HSS 114 for a registration notification.

HSS 114 notifies CSCF 112 via the registration notification when communication device 104 re-registers. CSCF 112 processes the registration notification and responsively transfers SIP invite messages to communication devices 102 and 104 in order to re-establish the dropped communication session. In this manner, CSCF 112 is able control the communication session by re-establishing the dropped communication session once communication device 104 re-registers.

Figure 2:
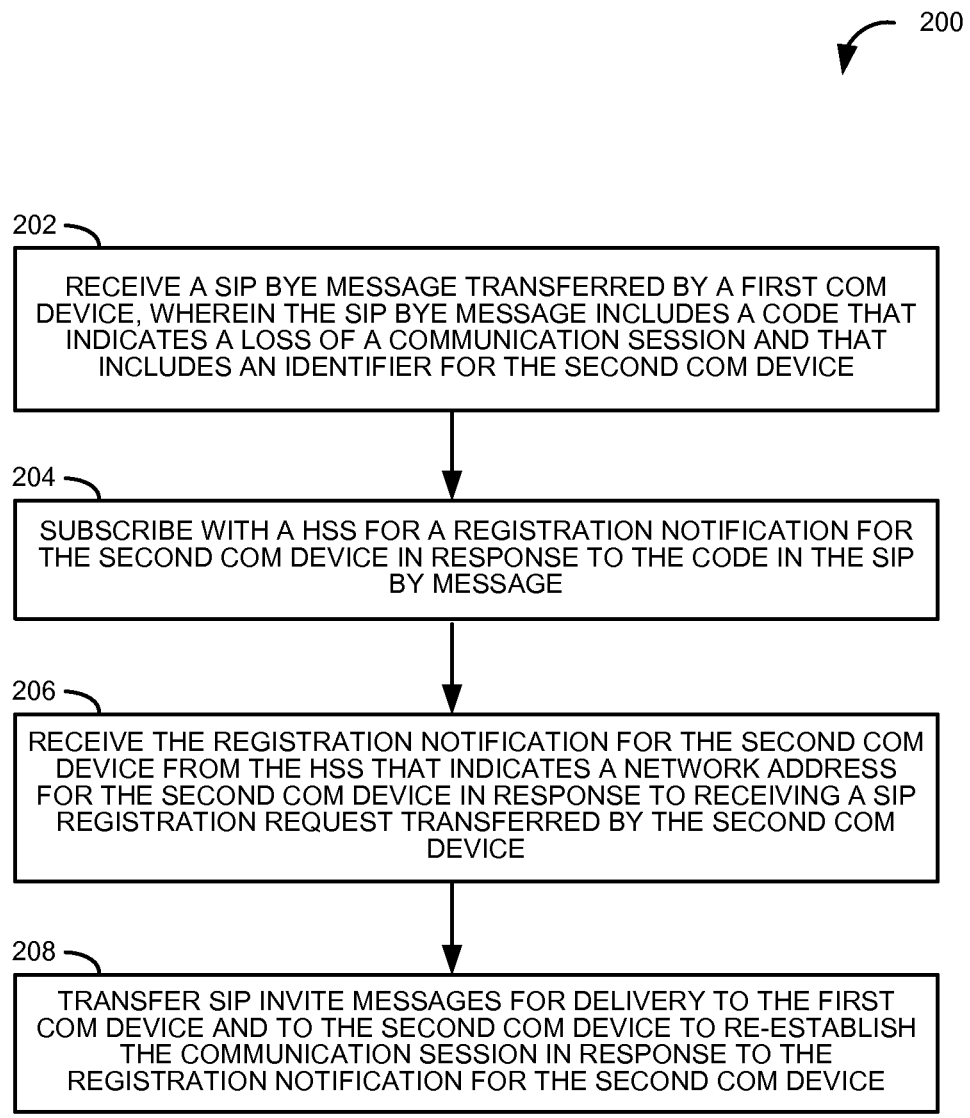
FIG. 2 illustrates operation of a communication system to subscribe for a service to control a communication session between a first communication device and a second communication device.

FIG. 2 illustrates the operation of IMS 110 in communication system 100 to subscribe for a service to control a communication session between a first communication device and a second communication device. To begin, a communication session is established between communication devices 102 and 104 over communication network 120. Communication device 102 subsequently detects a loss of signal and transmits a modified SIP bye message that includes a code. The code indicates a loss of the communication session and an identifier for communication device 104. CSCF 112 receives the modified SIP bye message that includes the code transferred by communication device 102 (202), and in response to the code included in the modified SIP message, CSCF 112 subscribes with HSS 114 for a registration notification for communication device 104 (204). In this manner, CSCF 112 is able to re-establish the dropped communication session once communication device 104 re-registers. For example, communication device 104 may transfer a SIP registration request when the device is ready to re-register. CSCF 112 subsequently receives the registration request and queries HSS 114 for authentication, authorization, and accounting (AAA) and a network address for communication device 104. HSS 114 receives the registration request and responds with the registration notification that indicates a network address for the communication device 104. CSCF 112 responsively receives the registration notification for communication device 104 from HSS 114 (206), and in response, CSCF 112 transfers SIP invite messages to communication devices 102 and 104 to re-establish the dropped communication session (208). In this manner, the communication session can be re-established once CSCF 112 receives acknowledgments from communication devices 102 and 104.

Figure 3:
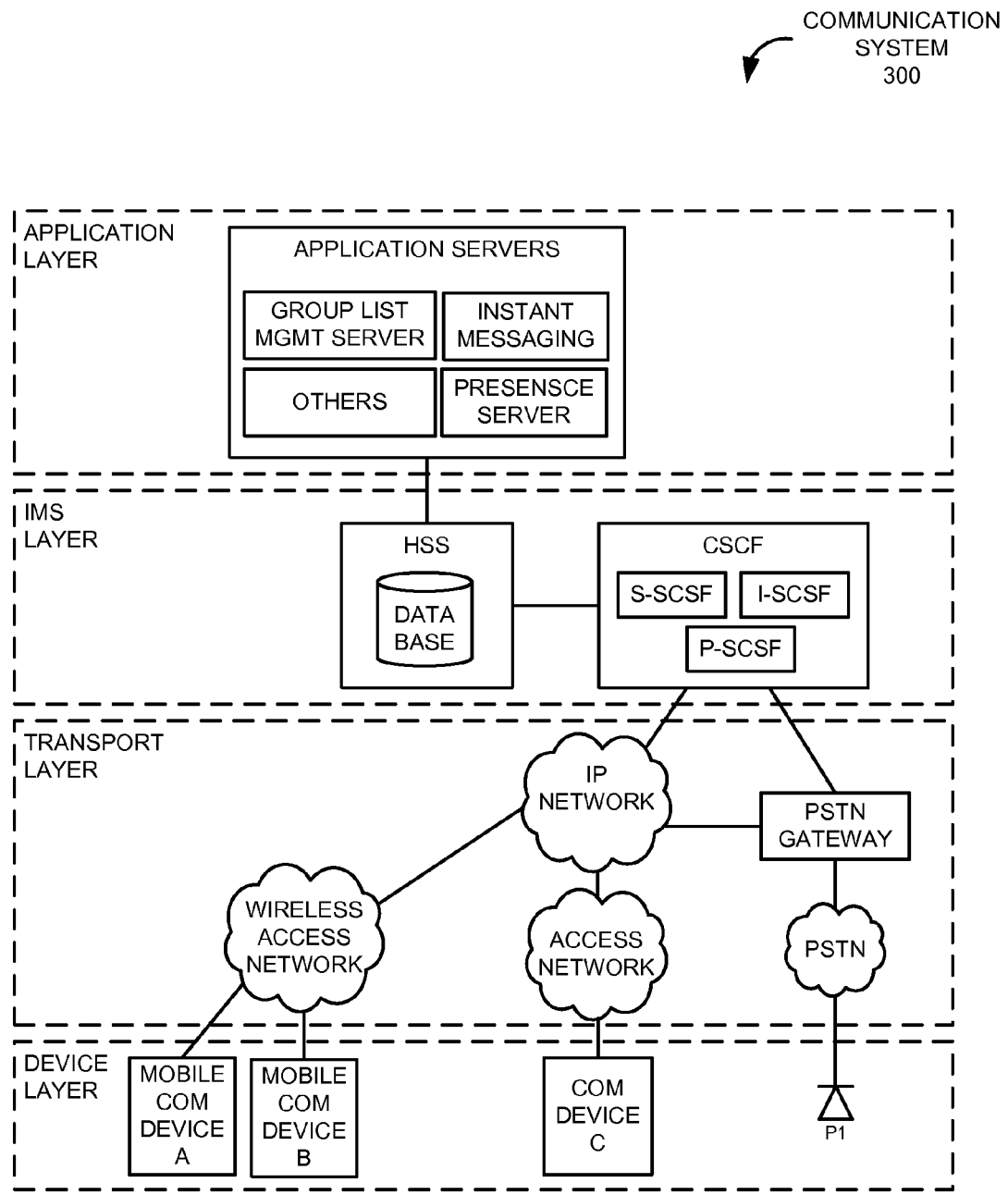
FIG. 3 illustrates operation of a communication system to subscribe for a service to control a communication session between a first communication device and a second communication device.

FIG. 3 illustrates operation of a communication system 300 to subscribe for a service to control a communication session between a first communication device and a second communication device. More specifically, communication system 300 illustrates an IMS architecture according to one example of operation to deliver Internet Protocol (IP) multimedia services to various communication devices and control a communication session between a first communication device and a second communication device. In this example, the horizontal IMS layer isolates the access networks from the service or application layers.

Communication system 300 includes a device layer, a transport layer, an IMS layer, and an application layer. As shown in this example, the device layer includes mobile communication devices A and B, a communication device C, and a traditional telephone P1. The communication devices communicate with each other and with the IMS layer via a transport layer. In operation, a device can connect to the IMS layer or IMS network in a variety of ways using standard Internet Protocols.

Mobile communication devices A and B may comprise mobile phones, personal digital assistants (PDAs), e-Readers, and/or other mobile computers—including combinations thereof. Mobile communication devices A and B may access the IMS network via the wireless access network using any mobile or wireless access technology such as, for example, W-CDMA, CDMA2000, GSM, GPRS, WLAN, LTE, and/or WiMAX. Communication device C may comprise any fixed IMS-compatible VoIP system and/or other computer system. Communication device C may access the IMS network via the access network using any fixed access technology such as digital subscriber line (DSL), cable modem, and/or Ethernet. In this example, traditional telephone P1 comprises a plain old telephone service (POTS) device and is supported through a PSTN and PSTN gateway. H.322 systems and/or non IMS-compatible VoIP systems may also be supported through a gateway, although these systems are not shown for simplicity.

The transport layer includes a wireless access network for connecting mobile communication devices A and B to the IP network, an access network for connecting communication device C to the IP network, and a PSTN and PSTN gateway for connecting traditional telephone P1 to the IP network and the IMS layer. The wireless access network, access network, and the IP network each comprise network elements and communication links. The wireless access network may include wireless base stations, network access points, gateways, routers, switches, call processors, servers, communication links, and the like. The access network may include network access points, gateways, routers, switches, call processors, servers, communication links, and the like. Similarly, the IP network may include routers, switches, and the like.

The IMS layer supports delivering IP multimedia services to communication devices 102 and 104 and aids in establishing communication sessions by providing authorization, authentication, and accounting and providing a network address for the communication devices attempting to register with IMS network. As shown, the IMS layer includes a CSCF and an HSS. The CSCF may include a plurality of entities that handle the calls. For example, the CSCF may include a proxy-CSCF (P-CSCF), serving-CSCF (S-CSCF), and interrogating-CSCF (I-CSCF). The S-CSCF is typically a SIP server that also performs session control. The S-CSCF is located in the home network and, in some examples, uses Diameter Cx and Dx interfaces to the HSS to download user profiles and upload user-to-S-CSCF associations.

The HSS includes a database that supports the CSCF. The HSS contains subscription related information such as subscriber profiles and performs the authentication, authorization, and accounting for communication devices attempting to register with the IMS network. The HSS also provides information about the subscriber's location and IP information and communicates with the various SIP application servers in the application layer.

The application layer includes various SIP application servers. An instant messaging server, a presence server, and a group list management server are shown. Other SIP and non-SIP application servers are possible but not shown for simplicity. The SIP application servers host and execute services, and interface with the CSCF using SIP. The application servers can be located in the home network and/or in an external third-party network. If located in the home network, the application servers can query the HSS with the Diameter SH or SI interfaces.

In operation, a device can connect to the IMS network in a variety of ways. For example, IMS terminals such as mobile communication devices A and B and communication device C can register directly on the IMS network because the IMS terminals use IP and run SIP user agents. Other phone systems, such as traditional phone system P1 (i.e., POTS devices) may be supported through a PSTN and a PSTN gateway. That is, traditional telephone P1 can register with the IMS network via the PSTN and PSTN gateway. Similarly, H.322 systems, and non IMS-compatible VoIP systems (not shown) may also register through a gateway.

Device registration may occur in a variety of ways, depending on the device. For example, a mobile communication device may register when it roams into an area covered by a base station or when the device powers up. A fixed wireless communication device such as IMS-compatible VoIP systems may register when they power up. Traditional devices such as plain old telephone service (POTS) devices, H.322 systems, and non IMS-compatible VoIP systems may register through a gateway when the devices attempt to establish a communication session.

A communication session may be established between any two registered terminals. The communication session may be, for example, a voice communication session, data communication session, or video communication session. In one example, a communication session is established between two mobile communication devices when the first registered mobile communication device transmits a SIP invite message indicating the second registered mobile communication device. The CSCF receives the invite message, processes the invite message to determine the second registered mobile communication device, and responsively transmits a SIP invite message to the second device.

The second communication device receives the SIP invite message from the CSCF and may responsively indicate the reception of the SIP invite message to a user. For example, the second communication device may indicate reception of the SIP invite message to a user via an audio or visual indication such as ringing or vibrating. The second communication device acknowledges the SIP invite message by, for example, transmitting a SIP acknowledge message in response to a user answering the second communication device. Typically, the second communication device acknowledges the SIP invite message by transmitting an acknowledge message in response to, for example, the user answering the telephone. A communication session is then established.

Figure 4:
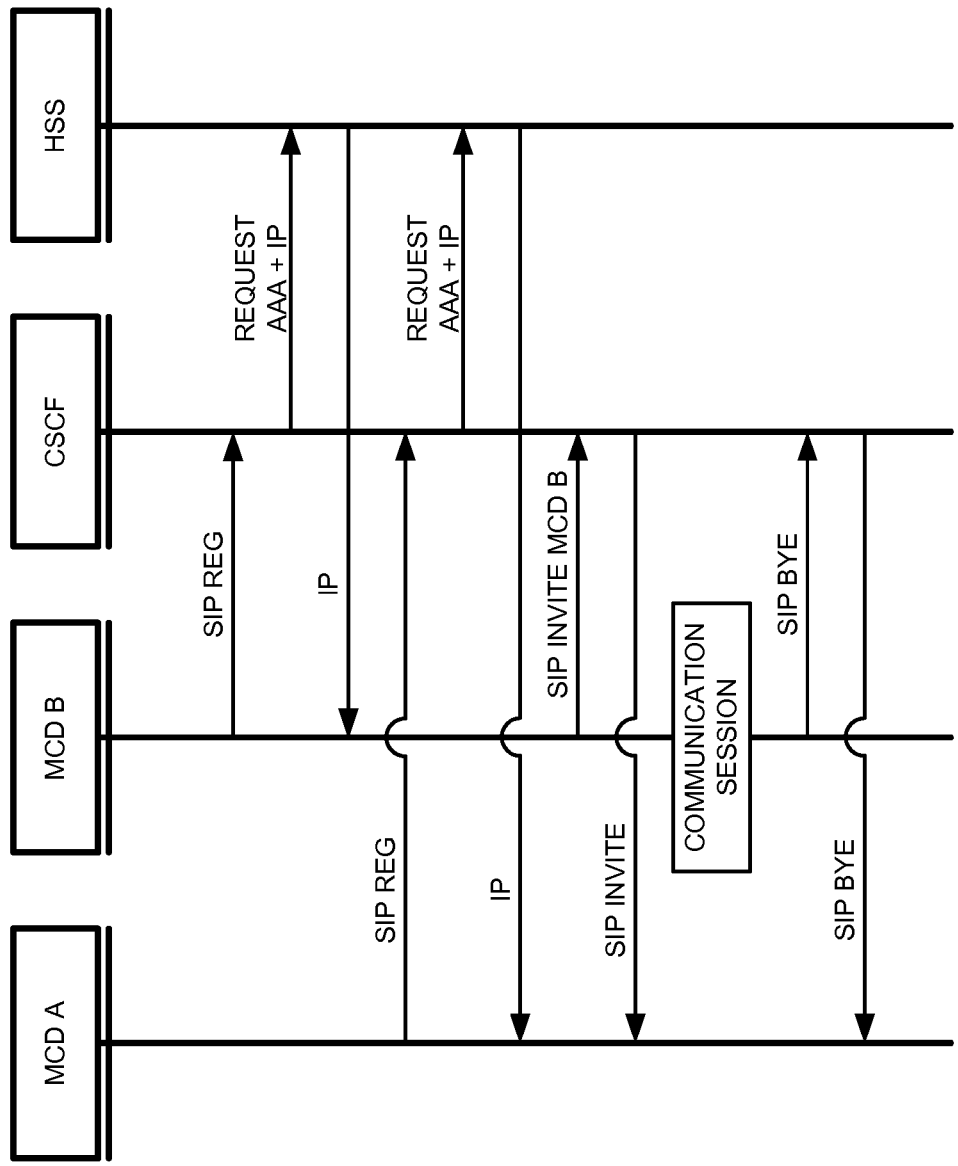
FIG. 4 illustrates operation of a communication system to establish and terminate a communication session between a first communication device and a second communication device.

FIG. 4 illustrates a sequence of operations of communication system 300 to establish and terminate a communication session between mobile communication device A and mobile communication device B according to an example of operation. Although not shown for simplicity, it is assumed that each operation in the sequence of operation is followed by a SIP acknowledge. However, in some cases SIP no-acknowledge messages are also possible.

To begin, mobile communication device B registers with the IMS network by transferring a SIP registration message to the CSCF. The SIP registration is received at the wireless access network, transferred to the IP network, and relayed on to the CSCF. The CSCF receives the SIP registration message and responsively transmits a request for authentication, authorization, and accounting and for an IP address for mobile communication device B. The HSS receives the request for authentication, authorization, and accounting for mobile communication device B and responsively performs the authentication, authorization, and accounting. The HSS determines the IP address for mobile communication device B and transfers the IP address to the CSCF which, in turn, forwards the IP address on to mobile communication device B.

Mobile communication device A then registers with the IMS network by transferring a SIP registration message to the CSCF. The SIP registration is received at the wireless access network, transferred to the IP network, and relayed on to the CSCF. The CSCF receives the SIP registration message and responsively transmits a request for authentication, authorization, and accounting and for an IP address for mobile communication device A. The HSS receives the request for authentication, authorization, and accounting for mobile communication device A and responsively performs the authentication, authorization, and accounting. The HSS determines the IP address for mobile communication device A and transfers the IP address to the CSCF which, in turn, forwards the IP address on to mobile communication device A.

Mobile communication device B then attempts to establish a communication session within mobile communication device A. As such, mobile communication device A transfers a SIP invite message to the CSCF that includes an identifier for mobile communication device B. The identifier may be, for example, the telephone number for mobile communication device A. The CSCF processes the SIP invite message to identify mobile communication device A and transfers a SIP invite message to mobile communication device A to commence a communication session. A communication session is established shortly thereafter.

The communication session is subsequently terminated. For example, mobile communication device A may move out of range of a tower or base station resulting in an inability to continue communication with the tower or base station. Mobile communication device B detects the loss of signal, and responsively transmits a SIP bye message to the CSCF. The CSCF processes the SIP bye message and terminates the communication session. In some cases, the CSCF also transfers a SIP bye message to mobile communication device A informing mobile communication device A of the terminated communication session. Mobile communication device A may or may not be in communication with the CSCF, and thus may or may not receive the SIP bye message from the CSCF. In this manner, a communication session is established and terminated.

Figure 5:
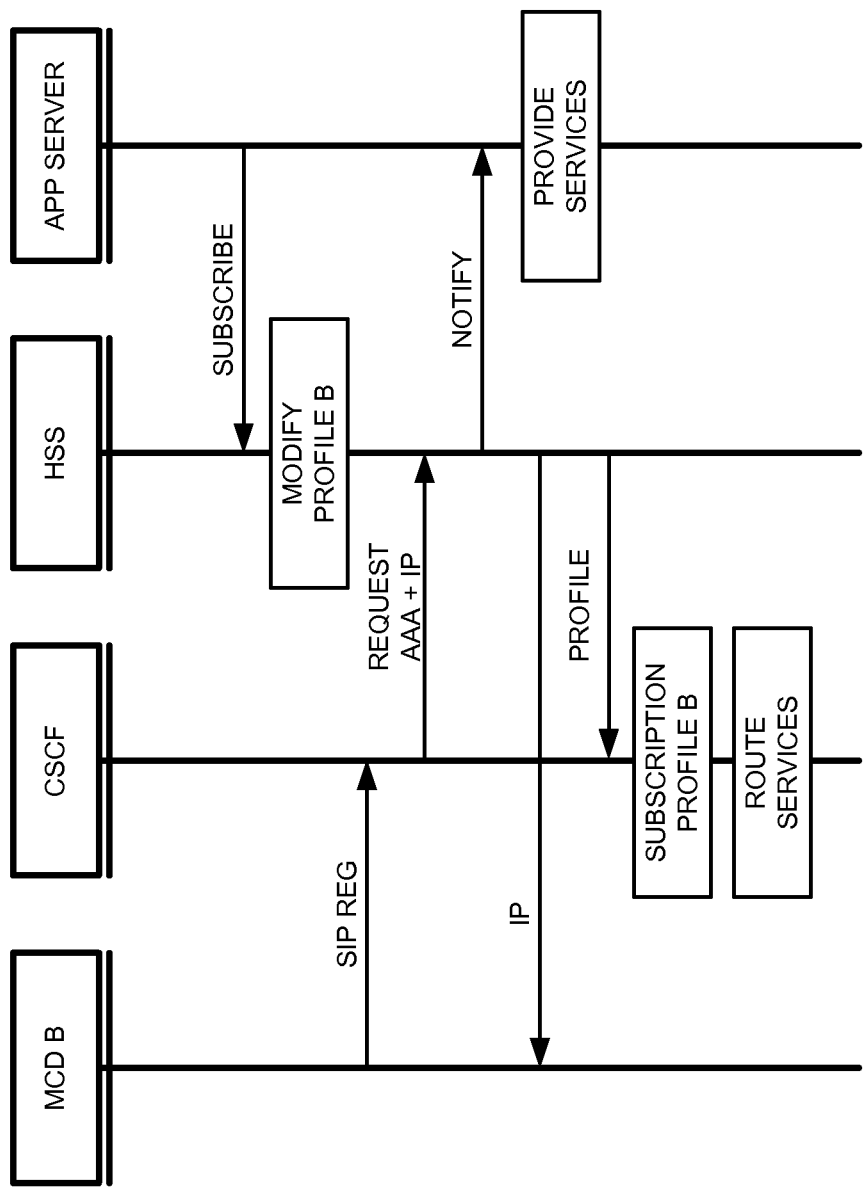
FIG. 5 illustrates operation of a communication system to subscribe for a service for a first communication device.

FIG. 5 illustrates a sequence of operations of communication system 300 to subscribe for a service for a first communication device. More specifically, a sequence of operations performed by communication system 300 is shown to allow a SIP application to be dynamically and differentially triggered according to an example of operation. Although not shown for simplicity, it is assumed that each operation in the sequence of operation is followed by a SIP acknowledge. However, in some cases SIP no-acknowledge messages are also possible.

To begin, the application server subscribes to the HSS for a service for mobile communication device B. The application server may subscribe to the HSS for any number of services. For example, the application server may subscribe for a text messaging service or a service that allows access to electronic mail (e.g., Internet-based email service) for mobile communication device B. In this example, the HSS receives the subscription and responsively modifies a subscription profile corresponding to a user of mobile communication device B. The user's subscription profile is subsequently accessed by the CSCF for authorization, authentication, and accounting and for an IP address in response to mobile communication device B transferring a SIP registration message to the CSCF.

In this example, the SIP registration is received at the wireless access network, transferred to the IP network, and relayed on to the CSCF. The CSCF receives the SIP registration message and responsively transmits the request for authentication, authorization, and accounting and for an IP address for mobile communication device B.

The HSS processes the request for authorization, authentication, and accounting and responsively performs the authorization, authentication, and accounting and determines the IP address for mobile communication device B. Based on the previous subscription, the HSS notifies the application server that mobile communication device B has registered. At this point the application server can provide services to mobile communication device B. In this way, the IMS network allows for a SIP application to be dynamically and differentially triggered. That is, SIP applications may be dynamically and differentially triggered based on, for example, a user's subscription profile accessed during authorization, authentication, and accounting.

Additionally, once mobile communication device B is authenticated and authorized, the HSS transfers the IP address to the CSCF. The CSCF relays the IP address on to mobile communication device B. In some examples, the CSCF may also download the subscription profile for mobile communication device B. In this case, the CSCF may route services. For example, the functionality of the service may be implemented as a filter-and-redirect signaling mechanism in the S-CSCF. That is, the S-CSCF may apply filter criteria to determine the need to forward SIP requests from mobile communication device B to the application server. The filter criteria are typically stored in the HSS as part of the user's subscription profile and are downloaded to the S-CSCF upon user registration (for registered users). The filter criteria represent a provisioned subscription of a user to an application. The filter criteria are typically valid throughout the registration lifetime or until the user profile is changed. In some cases, shared filter criteria may be used. The shared initial filter criteria comprise filter criteria that are common to a number of subscribers. In this way, the CSCF aids in routing the services provided by the application server.

Figure 6:
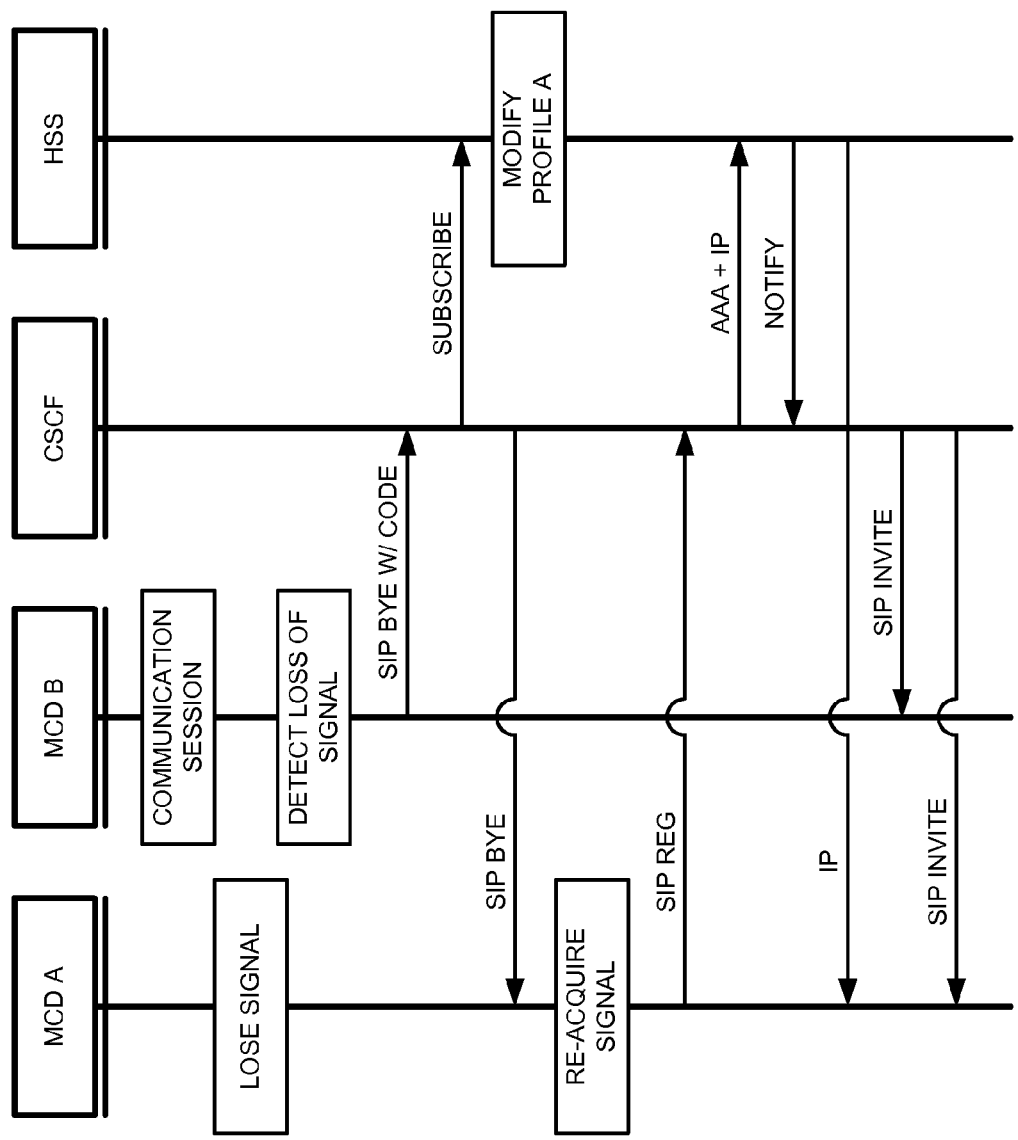
FIG. 6 illustrates operation of a communication system to subscribe for a service to control a communication session between a first communication device and a second communication device.

FIG. 6 illustrates operation of communication system 300 to subscribe for a service to control a communication session between a first communication device and a second communication device according to an example of operation. Although not shown for simplicity, it is assumed that each operation in the sequence of operation is followed by a SIP acknowledge. However, in some cases SIP no-acknowledge messages are also possible.

To begin a communication session is established between mobile communication device A and mobile communication device B. Mobile communication device subsequently loses its wireless signal resulting in a dropped call. In this case, the wireless signal is the strength or measure of the connection between a mobile communication device and its network. The wireless signal often depends on various factors, such as proximity to a tower and obstructions such as buildings or trees. The signal can be lost in areas where the wireless terminal cannot transmit to a nearby transceiver such as cell sites, base stations, or repeaters. When the wireless terminal loses its signal, even temporarily, a communication session or call may be dropped or otherwise terminated unexpectedly.

Mobile communication device B detects the loss of signal, and responsively generates and transmits a modified SIP bye message with a code to the CSCF. The code indicates the loss of communication session. In some cases the code may be transferred in, for example, a session description protocol. Mobile communication device B may detect the loss of signal in any number of ways. For example, mobile communication device B may detect the loss of the communication session based on a time period since receiving packets from the second communication device. In this case, the loss of signal is detected if the time period since receiving packets exceeds a threshold. Alternatively or additionally, communication device B may detect the loss of signal based on RTCP timeout for VoIP communication sessions or any of the standard techniques for circuit-based communication sessions.

The CSCF receives the modified SIP bye message and in response to the code, subscribes with the HSS for a registration notification service. The HSS responsively modifies the subscriber profile associated with mobile communication device A so that the HSS notifies the CSCF when mobile communication device A re-registers. Alternatively or additionally, HSS may modify the subscriber profile associated with mobile communication device B.

Mobile communication device A eventually re-acquires the wireless signal and responsively re-registers with the with the IMS network by transferring a SIP registration message to the CSCF. The CSCF receives the SIP registration message and responsively transmits a request for authentication, authorization, and accounting and for an IP address for mobile communication device A. The HSS receives the request for authentication, authorization, and accounting for mobile communication device A and performs the authentication, authorization, and accounting. The HSS determines the IP address for mobile communication device A and transfers the IP address to the CSCF which, in turn, forwards the IP address on to mobile communication device A. Additionally, the HSS processes the modified subscriber profile associated with communication device A, determines that the device subscribes to a registration notification service, and notifies the CSCF. As shown, the IP address is transferred prior to the NOTIFY message. However, these messages may come in any order or may be combined into a single message in some cases.

The CSCF receives the subscription notification from the HSS, processes the subscription notification, and responsively transmits SIP messages to mobile communication device A and to mobile communication device B to re-establish the communication session. In this manner, a unique registration notification service is provided that can re-establish dropped communication sessions without the use of an application server and without changing the IMS network architecture.

Figure 7:
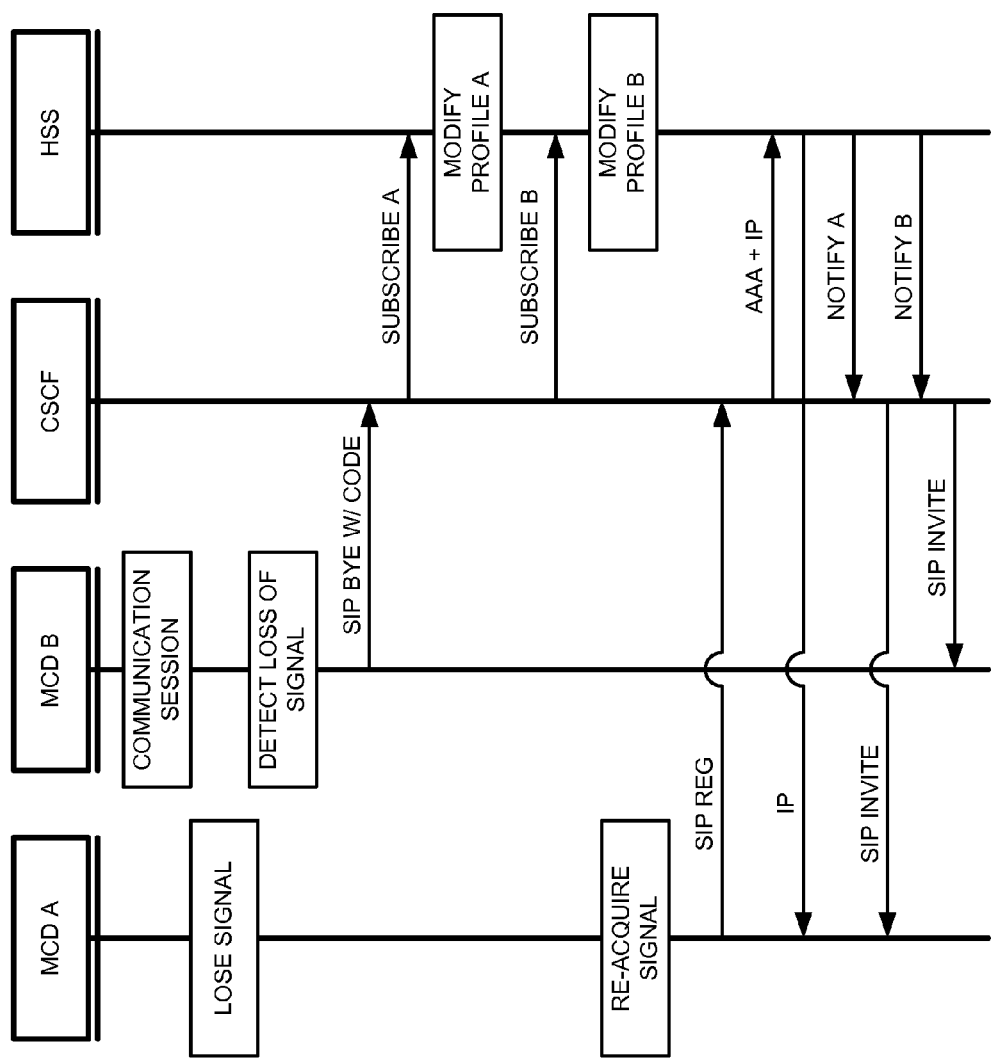
FIG. 7 illustrates operation of a communication system to subscribe for a service to control a communication session between a first communication device and a second communication device.

FIG. 7 illustrates operation of communication system 300 to subscribe for a service to control a communication session between a first communication device and a second communication device according to another example of operation. Although not shown for simplicity, it is assumed that each operation in the sequence of operation is followed by a SIP acknowledge. However, in some cases SIP no-acknowledge messages are also possible.

To begin a communication session is established between mobile communication device A and mobile communication device B. Mobile communication device subsequently loses its wireless signal resulting in a dropped call. In this case, the wireless signal is the strength or measure of the connection between a mobile communication device and its network. The wireless signal often depends on various factors, such as proximity to a tower and obstructions such as buildings or trees. The signal can be lost in areas where the wireless terminal cannot transmit to a nearby transceiver such as cell sites, base stations, or repeaters. When the wireless terminal loses its signal, even temporarily, a communication session or call may be dropped or otherwise terminated unexpectedly.

Mobile communication device B detects the loss of signal, and responsively generates and transmits a modified SIP bye message with a code to the CSCF. Mobile communication device B may detect the loss of signal in any number of ways. For example, mobile communication device B may detect the loss of the communication session based on a time period since receiving packets from the second communication device. In this case, the loss of signal is detected if the time period since receiving packets exceeds a threshold. Alternatively or additionally, communication device B may detect the loss of signal based on RTCP timeout for VoIP communication sessions or any of the stand techniques for circuit-based communication sessions.

The CSCF receives the modified SIP bye message and in response to the code, subscribes with the HSS for a registration notification services for users associated with mobile communication devices A and B. The HSS responsively modifies the subscriber profile associated with mobile communication devices A and B so that the HSS later notifies the CSCF when mobile communication device A re-registers.

Mobile communication device A eventually re-acquires the wireless signal and responsively re-registers with the with the IMS network by transferring a SIP registration message to the CSCF. The CSCF receives the SIP registration message and responsively transmits a request for authentication, authorization, and accounting and for an IP address for mobile communication device A. The HSS receives the request for authentication, authorization, and accounting for mobile communication device A and performs the authentication, authorization, and accounting. The HSS determines the IP address for mobile communication device A and transfers the IP address to the CSCF which, in turn, forwards the IP address on to mobile communication device A. Additionally, the HSS processes the modified subscriber profile associated with mobile communication devices A and B, determines that the devices subscribe to a registration notification service, and notifies the CSCF for mobile communication devices A and B. As shown, the IP address is transferred prior to the NOTIFY message. However, these messages may come in any order or may be combined into a single message in some cases.

The CSCF receives the subscription notifications from the HSS, processes the subscription notifications, and responsively transmits SIP messages to mobile communication device A and to mobile communication device B to re-establish the communication session. In this manner, a unique registration notification service is provided that can re-establish dropped communication sessions without the use of an application server and without changing the IMS network architecture.

Figure 8:
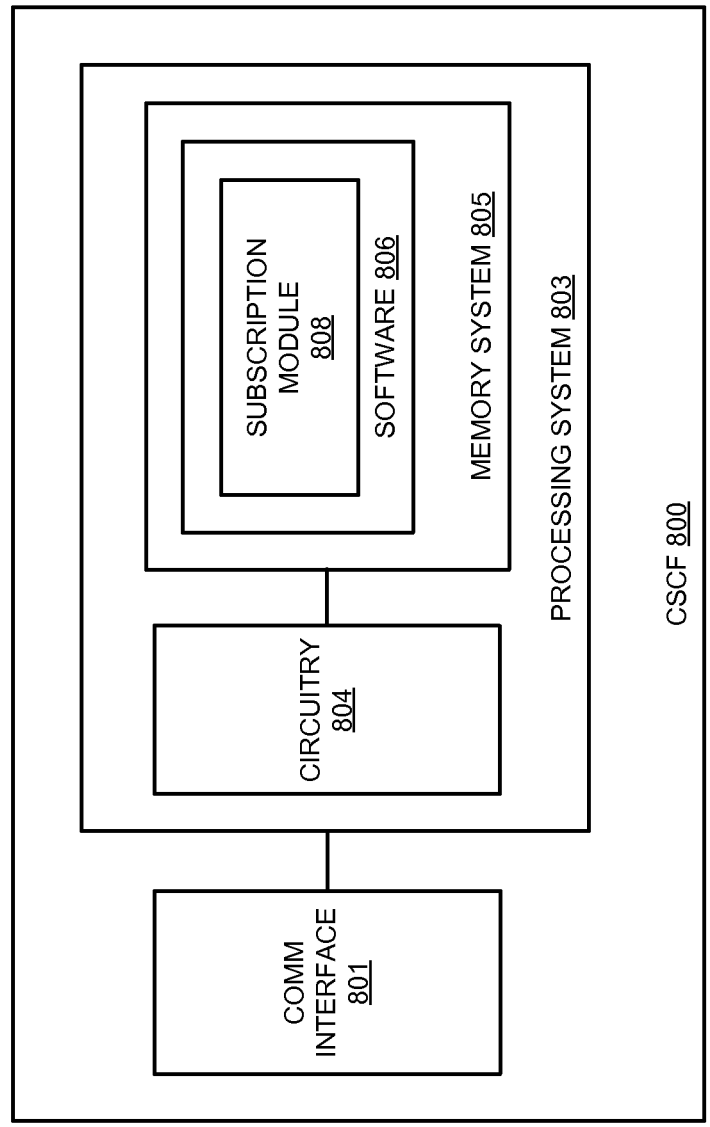
FIG. 8 illustrates a call session control function system to subscribe for a service to control a communication session between a first communication device and a second communication device.

FIG. 8 illustrates CSCF 800 to subscribe for a service to control a communication session between a first communication device and a second communication device. CSCF 800 provides an example of CSCF 112 of FIG. 1 and the CSCFC of FIG. 3, although these systems may use alternative configurations. CSCF 800 comprises communication interface 801 and a processing system 803. Processing system 803 is linked to communication interface 801. Processing system 803 includes processing circuitry 804 and memory system 805 that stores operating software 806. Operating software 806 comprises software module 808.

Communication interface 801 includes a network router and/or gateway equipment for communicating with access and/or communication networks of a wireless communication provider, such as with communication network 120 of FIG. 1. Communication interface 801 exchanges communications with a wireless communication system over a link to provide communication services, omitted for clarity. The link could use various protocols or communication formats as described herein, including combinations, variations, or improvements thereof.

Processing circuitry 804 comprises microprocessor and other circuitry that retrieves and executes operating software 806 from memory system 805. Processing circuitry 804 may comprise single device or be distributed across multiple devices—including devices in different geographic areas. Processing circuitry 804 may be embedded in various types of equipment.

Memory system 805 comprises a non-transitory storage medium, such as a disk drive, flash drive, data storage circuitry, or some other memory apparatus. Memory system 805 may comprise single device or be distributed across multiple devices—including devices in different geographic areas. Memory system 805 may be embedded in various types of equipment.

Operating software 806 comprises computer programs, firmware, or some other form of machine-readable processing instructions. Operating software 806 may include an operating system, utilities, drivers, network interfaces, applications, or some other type of software. In this example, operating software 806 also comprises software modules 808, although software 806 could have alternative configurations. When executed by processing circuitry 804, operating software 806 directs processing system 803 to operate as described herein to control a communication session between a first communication device and a second communication device.

In particular, when executed by a call session control function, subscription module 808 directs the call session control function to receive a session initiation protocol (SIP) bye message transferred by the first communication device, wherein the SIP bye message includes a code that indicates a loss of the communication session and that includes an identifier for the second communication device, subscribe with a home subscriber server for a registration notification for the second communication device in response to the code in the SIP bye message, receive the registration notification for the second communication device from the home subscriber server that indicates a network address for the second communication device in response to a SIP registration request transferred by the second communication device, and transfer SIP invite messages for delivery to the first communication device and to the second communication device to re-establish the communication session in response to the registration notification for the second communication device.

Referring back to FIG. 1, IMS 110 comprises a computer and communication systems that include processing circuitry, memory, software, and network communication interfaces. IMS 110 may also include routers, servers, call processors, communication links, and other communication network elements. CSCF 112 comprises a computer and communication system that comprises processing circuitry, memory, software, and network communication interfaces. CSCF may also include routers, call processors, communication links, and other communication network elements. HSS 114 comprises a database includes a plurality of user subscription profiles. HSS may also include a computer and communication system that comprises processing circuitry, memory, software, and network communication interfaces.

Communication network 120 comprises access systems, network elements and communication links. Communication network 120 may include wireless base stations, network access points, gateways, routers, switches, call processors, servers, communication links, and the like. Communication link 111 uses metal, glass, air, space, or some other material as the transport media. Communication link 111 may use various communication protocols, such as TDM, IP, Ethernet, wireless, or some other communication format—including combinations thereof. Communication link 111 may be one or more direct communication links or may comprise a combination of links, networks, systems, and devices.

Communication devices 102 and 104 could be communication devices such as telephones, transceivers, mobile phones, cellular phones, smartphones, computers, personal digital assistants (PDA), e-books, game consoles, mobile Internet devices, wireless network interface cards, media players, VoIP systems, or some other communication apparatus—including combinations thereof. In some examples, communication devices 102 and 104 may comprise mobile communication devices. The mobile communication devices comprise Radio Frequency (RF) communication circuitry and an antenna. The RF communication circuitry typically includes an amplifier, filter, modulator, and signal processing circuitry. Communication devices 102 and 104 may also include a user interface, memory device, software, processing circuitry, or some other communication components.

Wireless network protocols that may be utilized by communication devices 102 and 104 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between communication devices 102 and 104 and communication network 120.

In some examples, communication links 101 and 103 use the air or space as the transport media. Communication links 101 and 103 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

Alternatively or additionally, communication links 101 and 103 may use metal, glass, air, space, or some other material as the transport media. Communication links 101 and 103 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 101 and 103 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Session Initiation Protocol (SIP) system to control an Internet Protocol (IP) communication session between a first communication device and a second communication device, the method comprising:
    in a SIP control server, receiving a SIP bye message from the first communication device indicating a loss of the IP communication session with the second communication device, and in response, transferring a notification request for the second communication device to a SIP registration server, wherein the notification request requests a registration notification from the SIP registration server when the second communication device re-registers with the SIP registration server;
    in the SIP registration server, processing a SIP registration message from the second communication device, and in response to the notification request and the SIP registration message, transferring the registration notification to the SIP control server; and
    in the SIP control server, receiving the registration notification for the second communication device, and in response to the SIP bye message and the registration notification, transferring a SIP invite message to re-establish the IP communication session to the first communication device.

2. The method of claim 1 further comprising in the SIP control server, transferring another SIP invite message to re-establish the IP communication session to the second communication device.

3. The method of claim 1 wherein the SIP control server comprises an Internet Protocol Multimedia Subsystem (IMS) Call Session Control Function (CSCF).

4. The method of claim 1 wherein the SIP registration server comprises an Internet Protocol Multimedia Subsystem (IMS) Home Subscriber Server (HSS).

5. The method of claim 1 wherein the IP communication session comprises a voice session.

6. The method of claim 1 wherein the IP communication session comprises a video session.

7. The method of claim 1 wherein the first communication device transfers the SIP bye message to the SIP control server in response to detecting the loss of the IP communication session.

8. The method of claim 1 wherein the first communication device transfers the SIP bye message to the SIP control server in response to detecting the loss of the IP communication session by detecting that a time period since receiving packets from the second communication device exceeds a threshold.

9. The method of claim 1 wherein the second communication device comprises a mobile communication device.

10. The method of claim 1 wherein the second communication device comprises a Long Term Evolution (LTE) communication device.

11. A Session Initiation Protocol (SIP) system to control an Internet Protocol (IP) communication session between a first communication device and a second communication device, the SIP system comprising:
    a SIP control server configured to receive a SIP bye message from the first communication device indicating a loss of the IP communication session with the second communication device, and in response, transfer a notification request for the second communication device to a SIP registration server, wherein the notification request requests a registration notification from the SIP registration server when the second communication device re-registers with the SIP registration server;
    the SIP registration server configured to process a SIP registration message from the second communication device, and in response to the notification request and the SIP registration message, transfer the registration notification to the SIP control server; and
    the SIP control server configured to receive the registration notification for the second communication device, and in response to the SIP bye message and the registration notification, transfer a SIP invite message to re-establish the IP communication session to the first communication device.

12. The SIP system of claim 11 wherein the SIP control server is configured to transfer another SIP invite message to re-establish the IP communication session to the second communication device.

13. The SIP system of claim 11 wherein the SIP control server comprises an Internet Protocol Multimedia Subsystem (IMS) Call Session Control Function (CSCF).

14. The SIP system of claim 11 wherein the SIP registration server comprises an Internet Protocol Multimedia Subsystem (IMS) Home Subscriber Server (HSS).

15. The SIP system of claim 11 wherein the IP communication session comprises a voice session.

16. The SIP system of claim 11 wherein the IP communication session comprises a video session.

17. The SIP system of claim 11 wherein the first communication device transfers the SIP bye message to the SIP control server in response to detecting the loss of the IP communication session.

18. The SIP system of claim 11 wherein the first communication device transfers the SIP bye message to the SIP control server in response to detecting the loss of the IP communication session by detecting that a time period since receiving packets from the second communication device exceeds a threshold.

19. The SIP system of claim 11 wherein the second communication device comprises a mobile communication device.

20. The SIP system of claim 11 wherein the second communication device comprises a Long Term Evolution (LTE) communication device.

* * * * *